(12) United States Patent
Englund

(10) Patent No.: US 7,690,527 B2
(45) Date of Patent: Apr. 6, 2010

(54) SHAPED SEALING GASKET

(76) Inventor: Gary Englund, 2 Conesus Ct., Hawthorn Wood, IL (US) 60047

( * ) Notice: Subject to any disclaimer, the term of this patent is extended or adjusted under 35 U.S.C. 154(b) by 251 days.

(21) Appl. No.: 11/635,209

(22) Filed: Dec. 7, 2006

(65) Prior Publication Data

US 2007/0075084 A1 Apr. 5, 2007

Related U.S. Application Data

(63) Continuation-in-part of application No. 10/902,631, filed on Jul. 28, 2004, now abandoned.

(60) Provisional application No. 60/490,607, filed on Jul. 28, 2003.

(51) Int. Cl.
B65D 53/02 (2006.01)
B65D 53/00 (2006.01)
F16J 15/02 (2006.01)

(52) U.S. Cl. .................. 220/304; 215/343; 220/378; 277/647

(58) Field of Classification Search .............. 220/378, 220/304, 235, 233; 215/343, 345, 341; 277/626, 277/644, 647, 648
See application file for complete search history.

(56) References Cited

U.S. PATENT DOCUMENTS

| | | | |
|---|---|---|---|
| 3,294,409 A * | 12/1966 | Burtis | 277/644 |
| 3,441,166 A * | 4/1969 | De Frees | 220/324 |
| 3,637,223 A * | 1/1972 | Weber | 277/608 |
| 4,139,223 A * | 2/1979 | Clements | 285/99 |
| 4,188,040 A * | 2/1980 | Wolf et al. | 277/625 |
| 4,308,965 A * | 1/1982 | Dutt | 215/345 |
| 4,461,393 A * | 7/1984 | Dutt | 215/329 |
| 4,469,335 A * | 9/1984 | Moore | 277/648 |
| 4,582,330 A * | 4/1986 | Lew et al. | 277/587 |
| 4,584,163 A * | 4/1986 | Hankinson | 376/205 |
| 4,785,963 A * | 11/1988 | Magley | 220/266 |
| 4,927,182 A * | 5/1990 | Moore | 277/616 |
| 4,934,715 A * | 6/1990 | Johnson | 277/647 |
| 5,050,764 A * | 9/1991 | Voss | 220/378 |
| 5,277,327 A * | 1/1994 | Nakano et al. | 220/304 |
| 5,551,705 A * | 9/1996 | Chen et al. | 277/648 |
| 5,697,513 A * | 12/1997 | Molodyi | 220/320 |
| 5,730,446 A * | 3/1998 | Taylor et al. | 277/312 |
| 5,746,359 A * | 5/1998 | Stanek et al. | 222/542 |
| 5,971,189 A * | 10/1999 | Baughman | 220/288 |
| 2003/0024936 A1* | 2/2003 | Niese | 220/573.1 |
| 2006/0081635 A1* | 4/2006 | Matsutori et al. | 220/378 |
| 2006/0249512 A1* | 11/2006 | Ueda et al. | 220/378 |

* cited by examiner

Primary Examiner—Anthony Stashick
Assistant Examiner—Niki M Eloshway
(74) Attorney, Agent, or Firm—Barnes & Thornburg LLP

(57) ABSTRACT

The invention described herein is a shaped seal or gasket for use with a screw cap as commonly used in chemical barrels. The shaped gasket has a profile that includes a winged portion for contacting a sealing surface. The winged portion of the gasket defines a concave surface. The gasket has a second surface, or zone of contact, for contacting against a second surface, such as the underside of a screw cap. The winged portion of the gasket profile is wider than the zone of contact. The gasket profile can take on many different configurations, as shown in the drawings.

11 Claims, 3 Drawing Sheets

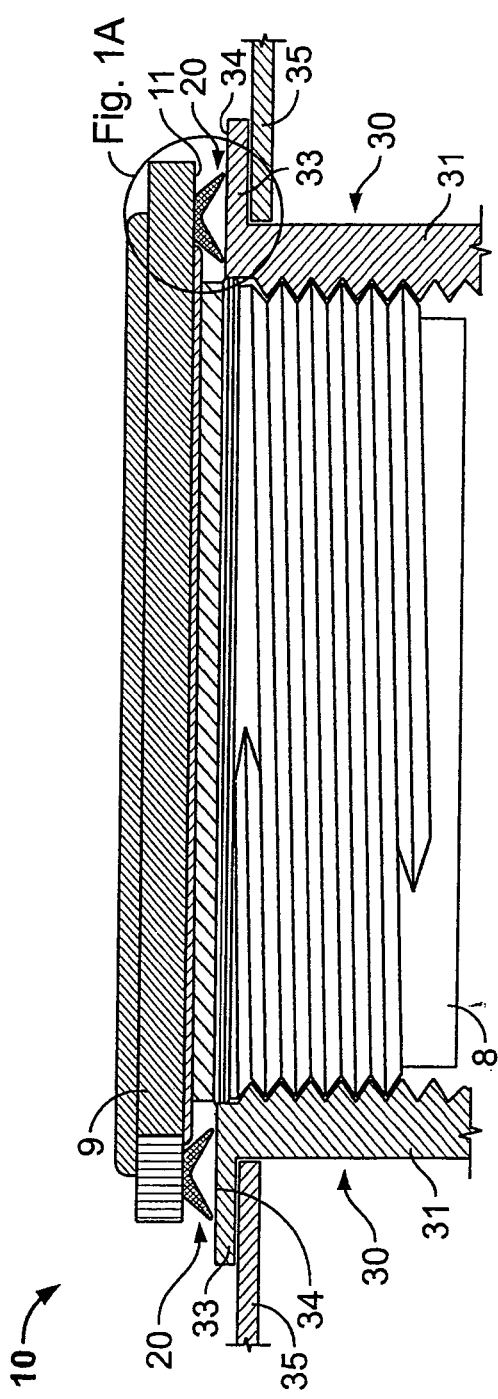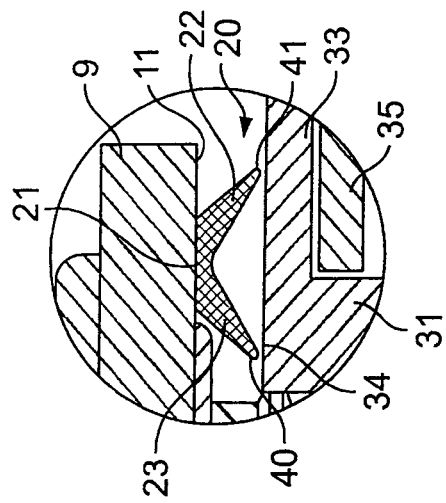
FIG. 1
FIG. 1A

SHAPED SEALING GASKET

RELATED APPLICATIONS

This application is a continuation-in-part of U.S. patent application Ser. No. 10/902,631 filed Jul. 28, 2004 now abandoned which claims priority to U. S.Provisional Application No. 60/490,607 filed on Jul. 28, 2003.

FIELD OF THE INVENTION

The invention relates a shaped gasket generally used in association with a cap to seal vessels, drums, casks, barrels or containers for containing liquid, or other applications where and air or liquid tight seal are required. An example of such a container is a 55 gallon drum having an aperture in its lid, the aperture being adapted to receive the cap and gasket, the gasket forming an air or watertight seal.

SUMMARY OF THE INVENTION

The disclosure herein is for a gasket or seal generally used with a screwcap. A typical application is the screw plug found in 55 gallon drums used for containing liquids. However, one skilled in the art will recognize that the gasket profiles described and claimed herein have applications in other apparatus where an air or watertight seal is desired, and need not be limited to annular gaskets .

The threaded cap and gasket shown herein is generally used for 55 gallon storage drums, and is screwed into a threaded hole or aperture in the drum. The threaded aperture is often times formed by inserting a flanged receiver into the lid or side wall of the drum. The flanged portion remains outside of the drum, with a cylindrical portion bearing the threads extending into the interior of the drum. The flanged portion then forms a bearing or sealing surface for the gasket when the cap is screwed in to the threaded aperture.

One skilled in the art will recognize that other types of securing structure could be used to secure the cap instead of threads. For example, the cap could be secured by friction fit, bayonet mount, or other mechanisms known for securing a cap or plug into an aperture. In any instance, the shaped gasket is included to form a water or air tight seal between the cap and a bearing surface surrounding the aperture.

The gaskets shape includes a portion that contacts the cap, and distended wing portions that form a profile wider than the portion of contact with the cap. The portion of the gasket between the distended portions is generally concave, so as to form two areas of initial contact with the opposing sealing surface. In some embodiments, the sealing surface may be shaped to provide a convex surface opposing the concave surface of the gasket. The gasket may be made of any material commonly used for gaskets, such as rubber, nylon, silicone, urethane, neoprene, polypropylene, polyethylene, or any other pliable material used in the gasket industry. The gasket may be made of the same material as the cap, and be formed as a unitary structure with the cap. Additionally, the gasket may be attached to the cap by a co-molding process, where the gasket and cap may or may not e constructed of the same material.

BRIEF DESCRIPTION OF THE DRAWINGS

FIG. 1 is a cross sectional view of a threaded cap and shaped gasket.

DETAILED DESCRIPTION OF THE PREFERRED EMBODIMENT

Figure 2:
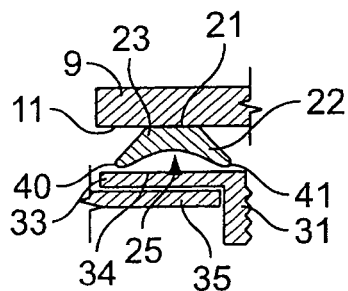
FIG. 2 is a cross-sectional view of the preferred embodiment of the gasket profile.

With reference to FIGS. 1 and 1A, a threaded cap 10 and gasket or seal 20 are shown in association with a threaded receiver 30 inserted into an aperture, such as would be used in the lid 35 of a 55 gallon drum or other container. The cap 10 includes a top portion 9 and a cylindrical portion 8 having threads. The receiver 30 includes a cylindrical portion 31 and a flange 33, the cylindrical portion 31 of the receiver adapted to receive the cylindrical portion 8 of the cap 10, allowing the cap 10 to be screwed into the receiver. In general, the underside 11 of the cap 10 is parallel to the flange 33, but such a relationship is not necessary. The flange 33 extends about the perimeter of the aperture a sufficient distance so as to form a sealing or bearing surface 34 for the gasket or seal 20, positioned on the underside 11 of the cap 10. In an alternate embodiment, the gasket or seal 20 bears upon the lid 35 of the drum. One skilled in the art will recognize the bearing surface 34 can be any structure below the underside 11 of the cap, such that the surface will form a water or airtight seal when the cap 10 is tightened into the receiver 30.

The gasket or seal 20, shown in profile in the drawings, is annular and extends around the cap 10. Although the gasket can touch both the cylindrical portion 8 and the top 9 of the cap 10, the gasket 20 can also be sized or positioned so that it does not contact the cylindrical portion 8 of the cap 10. In the preferred embodiment, the gasket or seal 20 has a zone of contact or attachment 21 that contacts the underside 11 of the cap 10. The zone of contact 21 may be attached to the cap 10 by a suitable adhesive, bonding, or other means of attachment such as co-molding, or it may be un-adhered and simply be in contact with the cap 10 at the zone of contact 21. In an alternate embodiment, the gasket 20 and cap 10 are made as a unitary structure, the zone of contact 21 in such an embodiment being defined as the same area of the structure as if the gasket were adhered to the underside 11 of the cap 10.

In the preferred embodiment, the zone of contact or attachment 21 of the gasket 20 is generally flat, as shown in the figures, or corresponds to the shape or surface to which it is contacting. For instance, if the underside 11 of the cap 10 had grooves, it is contemplated that the gasket 20 will have corresponding grooves on the zone of contact or attachment 21. Such correspondence however, is not necessary.

As shown in FIGS. 1, 2, 3, 7, 8, and 9, the seal 20 has distending winged portions 22 and 23 that extend away from the zone of contact or attachment 21. Thus, it is preferred that the widest portion of the gasket, in this instance the distending winged portions 22 and 23, is wider than the zone of contact 21. The seal 20 forms a generally concave shape between the ends 40 and 41 of the winged portions 22 and 23. Within these general parameters, it is recognized that the seal 20 may take different shapes in cross-section or profile, as exemplified in FIGS. 2 through 9. Further, it is not required that each of the winged portions be of the same shape.

In operation, as the cap 10 is screwed into the receiver 30, the winged portions 22 and 23 of the seal 20 contact a surface to achieve closure or a water or air tight seal. In the preferred embodiment, the seal is positioned around the cap 10 so that the winged portions 22 and 23 contact the receiver flange 33, barrel lid 35, or other bearing or sealing surface 34.

Figure 4:
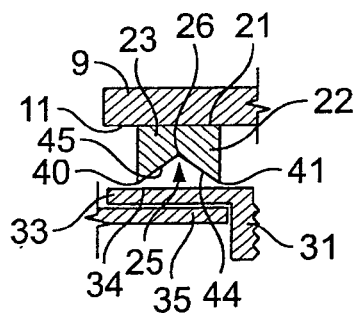
FIG. 4 is a cross-sectional view of an alternate embodiment of the gasket profile.
Figure 5:
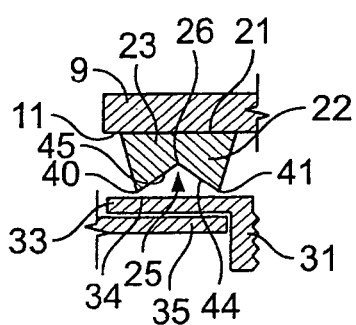
FIG. 5 is a cross-sectional view of an alternate embodiment of the gasket profile.
Figure 6:
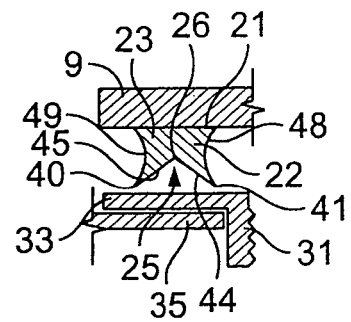
FIG. 6 is a cross-sectional view of an alternate embodiment of the gasket profile.

In alternate embodiments, as shown in FIGS. 4, 5 and 6, the winged portions 22 and 23 extend no wider than the zone of contact or attachment 21. As the cap 10 is screwed into the receiver 30, the seal or gasket 20 is compressed between the underside 11 of the cap 10 and the bearing surface 34. When compressed, the winged portions 22 and 23 of the seal or gasket 20 can extend beyond the width of the zone of contact or attachment 21.

As shown in the figures, the gasket or seal can take on a number of different shapes. One will recognize that the attribute and structures shown in any of the embodiments can be combined with those of the other embodiments to form profiles not shown, but consistent with the claimed invention. For instance, the profile shown in FIG. 1 could include the concave walls 48 and 49 as shown in FIG. 6.

As shown in FIG. 2, the seal 20 includes distending winged portions 22 and 23 that form an angle of approximately 45 degrees with respect to the underside 11 of the cap 10. The ends 40 and 41 of the winged portions 22 and 23 are generally rounded. Between the ends 40 and 41, the concave portion 25 is generally rounded as well, although the surface of the seal between the ends need not assume any particular shape, so long as it is concave.

Figure 3:
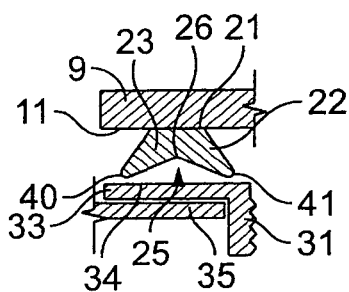
FIG. 3 is a cross-sectional view of an alternate embodiment of the gasket profile.

As shown in FIG. 3, the seal 20 can include a concave portion 25 that has generally straight walls 44 and 45 that converge at an vertex 26. Also shown in FIG. 3, the distending winged portions can exhibit an angle greater than 45 degrees with respect to the underside 11 of the cap 10. Such an angular arrangement allows for a larger zone of contact or Attachment 21 and increases the seal 20's resistance to compressive forces, as the cap 10 is screwed into the receiver 30.

In the alternate embodiment shown in FIG. 4, the winged portions form an angle of 90 degrees with the underside 11 of cap 10. In such an arrangement, the walls 44 and 45 are essentially perpendicular to both the underside 11 of the cap 10, and the bearing or sealing surface 34, when the gasket or seal 20 is in an uncompressed state. The alternate embodiment also demonstrates the ends 40 and 41 of the winged portions 22 and 23 can be generally pointed, rather than rounded. The concave portion 25 is formed by straight surfaces 46 and 47 meeting at an vertex 26. The distance from the vertex 26 to the underside 11 of the cap 10 is approximately one half of the distance from the ends 40 and 41 of the winged portions 22 and 23 to the underside 11 of the cap 10. Put another way, the concave portion 25 has a maximum depth that is roughly one half of the total height of the seal 20. The depth of the concave portion can vary from one eighth of the total height of the seal 20 to seven eighths of the maximum height of the seal 20. In the case of a co-molded cap and gasket, the maximum depth is not applicable, as the division between the cap and gasket is non-existent. In such an embodiment, the maximum depth of the cap can occur at a level above the underside of the cap.

As shown in FIG. 5, an alternate embodiment includes winged portions 22 and 23 that do not extend beyond the width of the zone of attachment or contact 21 when the seal 20 is in an uncompressed state. When such a seal 20 is compressed between the underside 11 of the cap 10 and the bearing or sealing surface 34, the ends 40 and 41 of the winged portions 22 and 23 can extend beyond the width of the zone of attachment 21.

As shown in FIG. 6, the walls 48 and 49 extending from the zone of contact 21 to the ends 40 and 41 of the winged portions 22 and 23 can be concave.

Figure 7:
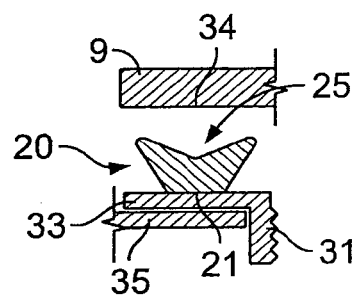
FIG. 7 is a cross-sectional view of an alternate embodiment of the gasket profile.
Figure 8:
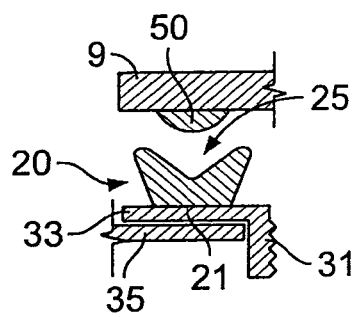
FIG. 8 is a cross-sectional view of an alternate embodiment of the gasket profile.
Figure 9:
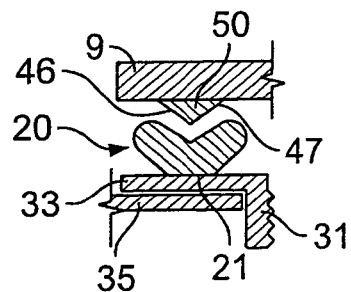
FIG. 9 is a cross-sectional view of an alternate embodiment of the gasket profile.

As shown in FIGS. 7, 8, and 9, the seal 20 can be attached to the barrel or flange 33 instead of the cap 10. In such an arrangement, the underside 11 of the cap 10 becomes the bearing or sealing surface 34, and the flange 33 bears upon the zone of contact 21. As shown in FIGS. 8 and 9, the sealing surface 34 may include a shape 50 protruding therefrom. Put another way, the bearing or sealing surface 34 need not be flat, but may be convex. The sealing surface 34 can also include contours or any shape or profile, including rounded and angular portions. The shape is received by the concave portion 25 of the seal 20, thereby providing a greater surface area of contact for the seal 20. The shape 50 need not be of complimentary shape to the concave portion 25. As shown in FIG. 8, the shape 50 can be generally rounded, and the concave portion 25 of the seal 20 can be angular, having straight surfaces 46 and 47. However, in other embodiments, the shape 50 can be complimentary, as shown in FIG. 9. Such a complimentary arrangement maximizes the contact surface area with the concave portion 25 of the seal 20.

Figure 10:
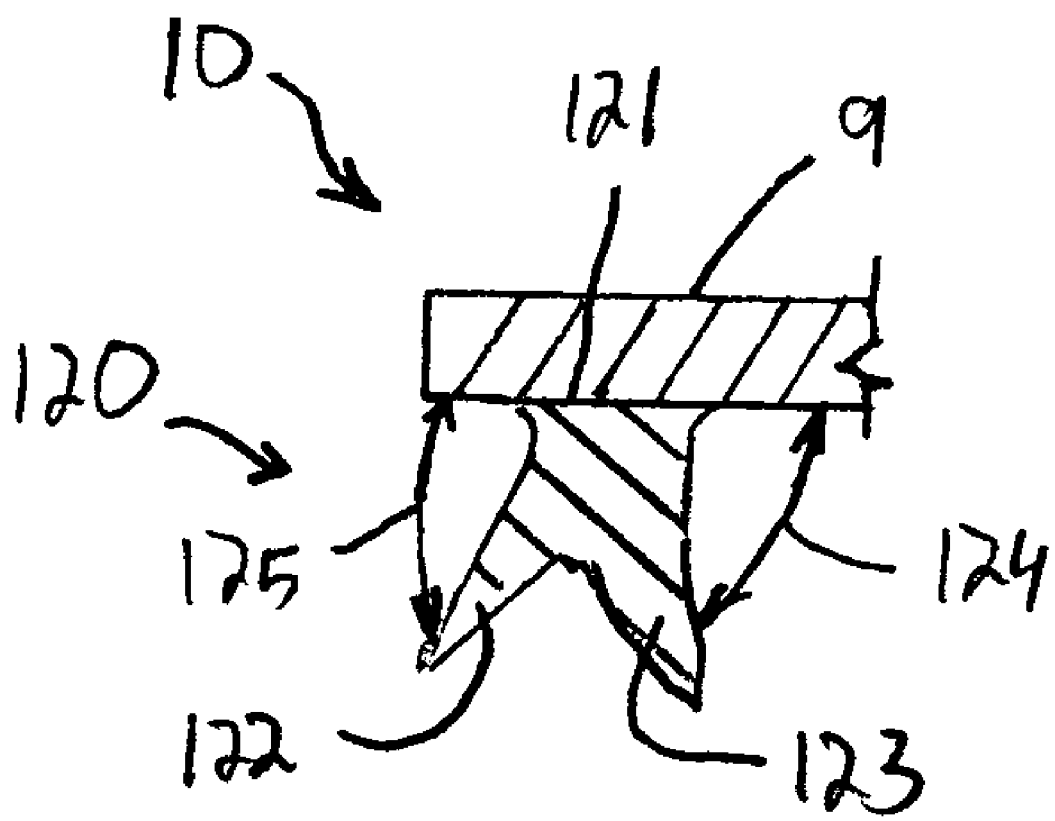
FIG. 10 is a cross-sectional view of a further alternate embodiment of the gasket profile.

A further alternative embodiment is shown in FIG. 10. Similar to the earlier embodiments of the invention, the gasket or seal 120, while shown in profile, is annual and extends around the cap. The gasket or seal 20 has a zone of contact or attachment 121 that contacts the underside of the cap in the same fashion as described above. The zone of contact 121 may be where the gasket or seal 120 is attached by any suitable means, such as adhesives, bonding, welding, or any other means of attachment such as co-molding, as appropriate. In an alternative, the gasket or seal 120 can be part of the cap and made as a unitary structure.

In this form of the invention, the seal 120 has distending winged portions or ribs 122 and 123 that extend away from the zone of contact or attachment 121. Unlike the earlier forms of the invention, the embodiment shown in FIG. 10 is not symmetrical, in that the winged portion 123 forms an angle 124 with the cap, the angle 124 being different than the angle 125 that the winged portion 122 forms with the cap. Preferably the angle 124 is on the order of 90° while the angle 125 is on the order of 75°. Also as illustrated, the winged portion 123 extends farther away from the cap than the winged portion 122. Thus, the main seal is the winged portion 123, with the winged portion 122 forming a secondary seal. Preferably the wings 122 and 123 are formed about a 15° included angle.

As thus illustrated, the gasket or seal 120 is not symmetrical and provides what is believed to be a superior seal. Also, while the preferred configuration is as illustrated in FIG. 10, the configuration can be a mirror image of that illustrated, thus with the angle 125 being approximately 90° and the angle 124 being approximately 75°, and the same type of seal will result.

While the angles 124 and 125 are preferred within the ranges set forth above, there can be variances from those angles and still be within the scope of the invention, so long as there is a difference of about 15° between the angles 124 and 125.

The description and drawings of the preferred embodiment are merely illustrated in nature, and the present application includes all other embodiments and equivalents that are within the spirit and scope of the described embodiment.

I claim:

1. A cap and gasket for creating a seal with a sealing surface, the cap having a threaded cylindrical portion for mating with a corresponding threaded aperture and a top portion extending radially beyond the cylindrical portion and having an underside opposing the sealing surface, said gasket having a zone of contact from which said gasket is attached and extends from the underside of the cap, the gasket having a profile including a pair of winged portions extending away from the zone of contact, said winged portions forming a sealing width greater than the width of the zone of contact, the winged portions forming a concave surface spaced outwardly from the zone of contact for creating a seal against the sealing surface, the winged portions being asymmetrical with one of said winged portions forming an angle with the underside which is different from an angle formed by the other winged portion, the gasket being positioned so as not to contact the cylindrical portion of the cap.

2. The gasket of claim 1, the winged portions terminating in ends and forming the concave surface therebetween, the concave surface having two flat surfaces meeting at an vertex.

3. The gasket of claim 2, where at least one of the ends is rounded.

4. The gasket of claim 1, in which one of the winged portions forms an angle of about 90° with the underside, and the other winged portion forms an angle of about 75° with the underside.

5. The gasket of claim 1, in which the winged portions are formed with a 15° included angle.

6. The gasket of claim 1, in which one of the winged portions extends farther from the underside than the other of the winged portions.

7. The gasket of claim 1, wherein the sealing surface is flat.

8. The gasket of claim 1, wherein the sealing surface is shaped to complement the gasket.

9. The gasket of claim 1, wherein the concave surface is formed by two straight surfaces meeting at a junction.

10. The gasket of claim 1, wherein the gasket is annular.

11. The gasket of claim 1, wherein the gasket is made of a material from the following group: rubber, nylon, silicone, urethane, or neoprene, polypropylene, or polyethylene.

* * * * *